(12) United States Patent
Spencer

(10) Patent No.: US 6,797,039 B2
(45) Date of Patent: Sep. 28, 2004

(54) METHODS AND SYSTEMS FOR SELECTIVELY SEPARATING $CO_2$ FROM A MULTICOMPONENT GASEOUS STREAM

(76) Inventor: Dwain F. Spencer, 13474 Tierra Heights Rd., Redding, CA (US) 96003

( * ) Notice: Subject to any disclaimer, the term of this patent is extended or adjusted under 35 U.S.C. 154(b) by 0 days.

(21) Appl. No.: 10/331,171

(22) Filed: Dec. 27, 2002

(65) Prior Publication Data

US 2004/0123738 A1 Jul. 1, 2004

(51) Int. Cl.[7] .............................................. B01D 53/14
(52) U.S. Cl. .............................. 95/153; 95/236; 96/243; 423/220; 423/437.1; 585/15
(58) Field of Search .......................... 95/236, 153, 211; 585/15; 96/293, 290, 299; 423/220, 437.1

(56) References Cited

U.S. PATENT DOCUMENTS

| | | | |
|---|---|---|---|
| 5,362,467 A | * | 11/1994 | Sakai et al. .............. 423/437.1 |
| 5,364,611 A | * | 11/1994 | Iijima et al. ............. 423/437.1 |
| 5,434,330 A | * | 7/1995 | Hnatow et al. ............. 585/864 |
| 5,536,893 A | * | 7/1996 | Gudmundsson .............. 585/15 |
| 5,562,891 A | * | 10/1996 | Spencer et al. .......... 423/437.1 |
| 5,700,311 A | | 12/1997 | Spencer |
| 6,028,234 A | * | 2/2000 | Heinemann et al. .......... 585/15 |
| 6,090,186 A | | 7/2000 | Spencer |
| 6,106,595 A | | 8/2000 | Spencer |
| 6,235,091 B1 | | 5/2001 | Spencer |
| 6,235,092 B1 | | 5/2001 | Spencer |
| 6,352,576 B1 | | 3/2002 | Spencer et al. |
| 6,372,023 B1 | * | 4/2002 | Kiyono et al. ................ 95/228 |
| 6,602,326 B2 | * | 8/2003 | Lee et al. ...................... 95/53 |
| 6,620,091 B1 | * | 9/2003 | Zavell et al. ............... 588/250 |

* cited by examiner

*Primary Examiner*—Duane S. Smith
(74) *Attorney, Agent, or Firm*—Bret E. Field; Bozicevic, Field & Francis LLP

(57) ABSTRACT

Methods are provided for the selective removal of $CO_2$ from a multicomponent gaseous stream to provide a $CO_2$ depleted gaseous stream. In practicing the subject methods, an initial multicomponent gaseous stream that includes a gaseous $CO_2$ hydrate promoter is contacted with an aqueous fluid, e.g., $CO_2$ nucleated water, in a hydrate formation reactor under conditions of selective $CO_2$ clathrate formation to produce a $CO_2$ clathrate slurry and $CO_2$ depleted gaseous stream. Also provided are systems that find use in practicing the subject methods. The subject methods and systems find use in a variety of applications where it is desired to selectively remove $CO_2$ from a multicomponent gaseous stream.

20 Claims, 3 Drawing Sheets

METHODS AND SYSTEMS FOR SELECTIVELY SEPARATING CO₂ FROM A MULTICOMPONENT GASEOUS STREAM

FIELD OF THE INVENTION

The field of this invention is selective absorption of $CO_2$ gas.

INTRODUCTION

In many applications where mixtures of two or more gaseous components are present, it is often desirable to selectively remove one or more of the component gases from the gaseous stream. Of increasing interest in a variety of industrial applications, including power generation, chemical synthesis, natural gas upgrading, and conversion of methane hydrates to hydrogen and $CO_2$, is the selective removal of $CO_2$ from multicomponent gaseous streams.

An example of where selective $CO_2$ removal from a multicomponent gaseous stream is desirable is the processing of synthesis gas or syngas. Syngas is a mixture of hydrogen, carbon monoxide and $CO_2$ that is readily produced from fossil fuels and finds use both as a fuel and as a chemical feedstock. In many applications involving syngas, the carbon monoxide is converted to hydrogen and additional $CO_2$ via the water-gas shift process. It is then often desirable to separate the $CO_2$ from the hydrogen to obtain a nearly pure $H_2$ stream for subsequent use, e.g. as a fuel or feedstock.

As man made $CO_2$ is increasingly viewed as a pollutant, another area in which it is desirable to separate $CO_2$ from a multicomponent gaseous stream is in the area of pollution control. Emissions from industrial facilities, such as manufacturing and power generation facilities, often include $CO_2$. In such instances, it is often desirable to at least reduce the $CO_2$ concentration of the emissions. The $CO_2$ may be removed prior to combustion in some cases and post combustion in others.

A variety of processes have been developed for removing or isolating a particular gaseous component from a multicomponent gaseous stream. These processes include cryogenic fractionation, selective adsorption by solid adsorbents, gas absorption, and the like. In gas absorption processes, solute gases are separated from gaseous mixtures by transport into a liquid solvent. In such processes, the liquid solvent ideally offers specific or selective solubility for the solute gas or gases to be separated.

Gas absorption finds widespread use in the separation of $CO_2$ from multicomponent gaseous streams. In $CO_2$ gas absorption processes that currently find use, the following steps are employed: (1) absorption of $CO_2$ from the gaseous stream by a host solvent, e.g. monoethanolamine; (2) removal of $CO_2$ from the host solvent, e.g. by steam stripping; and (3) compression of the stripped $CO_2$ for disposal, e.g. by sequestration through deposition in the deep ocean or ground aquifers.

Although these processes have proved successful for the selective removal of $CO_2$ from a multicomponent gaseous stream, they are energy intensive and expensive in terms of cost per ton of $CO_2$ removed or sequestered. For example, using the above processes employing monoethanolamine as the selective absorbent solvent to remove $CO_2$ from effluent flue gas generated by a power plant often requires 25 to 30% of the available energy generated by the plant. In most situations, this energy requirement, as well as the additional cost for removing the $CO_2$ from the flue gas, is prohibitive.

Accordingly, there is continued interest in the development of less expensive and/or energy intensive processes for the selective removal of $CO_2$ from multicomponent gaseous streams. Ideally, alternative $CO_2$ removal processes should be simple, require inexpensive materials and low energy inputs, and be low in cost for separation and sequestration of the $CO_2$. Of particular interest would be the development of a process which provided for efficient $CO_2$ separation at low temperature (e.g., 0 to 10° C.) from low to moderate $CO_2$ partial pressure multicomponent gaseous streams.

Relevant Literature

U.S. Patents of interest include U.S. Pat. Nos.: 5,700,311; 6,090,186; 6,106,595; 6,235,091; 6,235,092 and 6,352,576.

SUMMARY OF THE INVENTION

Methods are provided for the selective removal of $CO_2$ from a multicomponent gaseous stream to provide a $CO_2$ depleted gaseous stream. In practicing the subject methods, an initial multicomponent gaseous stream that includes a gaseous $CO_2$ hydrate promoter is contacted with an aqueous fluid, e.g., $CO_2$ nucleated water, in a hydrate formation reactor under conditions of selective $CO_2$ clathrate formation to produce a $CO_2$ clathrate slurry and $CO_2$ depleted gaseous stream. In certain embodiments, a feature of the subject invention is that additional gaseous $CO_2$ hydrate promoter is introduced into the process stream at some point prior to the output of the hydrate reactor. In certain embodiments, a feature of the subject invention is that the hydrate formation reactor is a tubular finned reactor. Also provided are systems that find use in practicing the subject methods. The subject methods and systems find use in a variety of applications where it is desired to selectively remove $CO_2$ from a multicomponent gaseous stream.

DETAILED DESCRIPTION OF THE INVENTION

Figure 1:
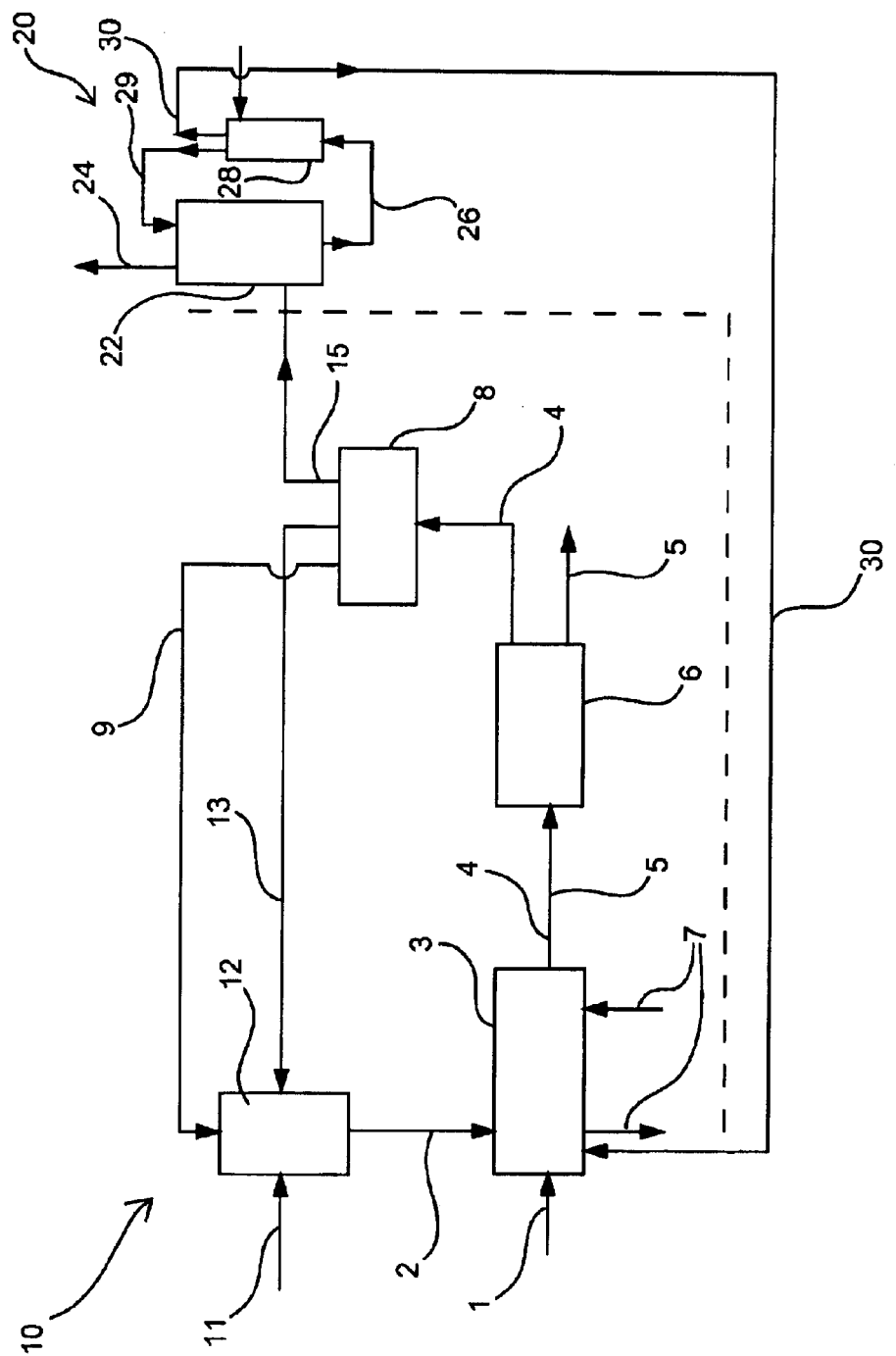
FIG. 1 provides a schematic diagram of a system according to an embodiment of the subject invention.

Methods are provided for the selective removal of $CO_2$ from a multicomponent gaseous stream to provide a $CO_2$ depleted gaseous stream. In practicing the subject methods, an initial multicomponent gaseous stream that includes a gaseous $CO_2$ hydrate promoter is contacted with an aqueous fluid, e.g., $CO_2$ nucleated water, in a hydrate formation reactor under conditions of selective $CO_2$ clathrate formation to produce a $CO_2$ clathrate slurry and $CO_2$ depleted gaseous stream. In certain embodiments, a feature of the subject invention is that additional gaseous $CO_2$ hydrate promoter is introduced into the process stream at some point prior to the output of the hydrate reactor. In certain embodiments, a feature of the subject invention is that the hydrate formation reactor is a tubular finned reactor. Also provided are systems that find use in practicing the subject methods. The subject methods and systems find use in a variety of applications where it is desired to selectively remove $CO_2$ from a multicomponent gaseous stream.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

All publications mentioned herein are incorporated herein by reference for the purpose of describing and disclosing the elements that are described in the publications which might be used in connection with the presently described invention.

In further describing the subject invention, representative embodiments of the subject methods are described first in greater detail, followed by a more detailed review of representative embodiments of systems and finned tubular reactors thereof of the subject invention.

Methods

As summarized above, the subject invention provides a method of selectively removing $CO_2$ from multicomponent gaseous stream.

In the subject methods, the first step is to provide a multicomponent gaseous stream that includes a gaseous $CO_2$ hydrate promoter. Specifically, a multicomponent gaseous stream that includes an amount of a $CO_2$ hydrate promoter is provided. The amount of $CO_2$ hydrate promoter that is present in the multicomponent gaseous stream is generally sufficient to provide for a reduction in the $CO_2$ partial pressure requirement of hydrate formation, as described in U.S. Pat. No. 6,352,576, the disclosure of which is herein incorporated by reference. The specific amount of gaseous $CO_2$ hydrate promoter that is present in the provided multicomponent gaseous stream of this first step depends, in large part, on the nature of the multicomponent gaseous stream, the nature of the $CO_2$ hydrate promoter, and the like. Generally, the amount of $CO_2$ hydrate promoter that is present, initially, in the multicomponent gaseous stream ranges from about 1 to 5 mole percent, usually from about 1.5 to 4 mole percent and more usually from about 2 to 3 mole percent, in many embodiments.

Any convenient gaseous $CO_2$ hydrate promoter that is capable of providing the abovedescribed reduction in $CO_2$ partial pressure requirement of hydrate formation when present in the multicomponent gaseous stream may be employed.

One type of gaseous $CO_2$ hydrate promoter is a sulfur containing compound, where specific sulfur containing compounds of interest include: $H_2S$, $SO_2$, $CS_2$ and the like. Where the $CO_2$ hydrate promoter is $H_2S$, it is generally present in the multicomponent gaseous stream in an amount ranging from about 1.0 to 5.0 mole percent, usually from about 1.5 to 4.0 mole percent and more usually from about 2.0 to 3.0 mole percent. Where the $CO_2$ hydrate promoter is $SO_2$, it is generally present in the multicomponent gaseous stream in an amount ranging from about 1.0 to 5.0 mole percent, usually from about 1.5 to 4.0 mole percent and more usually from about 2.0 to 3.0 mole percent.

The multicomponent gaseous stream may be provided in the first step of the subject invention using any convenient protocol. In certain embodiments, a multicomponent gaseous stream of interest will merely be tested to ensure that it includes the requisite amount of $CO_2$ hydrate promoter of interest. Generally, however, this step requires adding a sufficient amount of the $CO_2$ hydrate promoter to the multicomponent gaseous stream to be treated. The requisite amount of $CO_2$ hydrate promoter that needs to be added to a given multicomponent gaseous stream of interest necessarily varies depending on the nature of the gaseous stream, the nature of the $CO_2$ hydrate promoter, the desired $CO_2$ separation ratio and the like. The requisite amount of $CO_2$ hydrate promoter may be added to the multicomponent gaseous stream using any convenient protocol, e.g., by combining gaseous streams, adding appropriate gaseous components, etc.

Following provision of the multicomponent gaseous stream that includes the requisite amount of $CO_2$ hydrate promoter (when desired), the next step in the subject methods is to contact the multicomponent gaseous stream with an aqueous fluid under conditions sufficient for $CO_2$ hydrate formation to occur. Any convenient aqueous fluid may be employed, where aqueous fluids of interest include water, either pure water or salt water, $CO_2$ nucleated water as described in U.S. Pat. No. 5,700,311 and U.S. patent application Ser. Nos. 09/067,937 (now issued as U.S. Pat. No. 6,090,937 on Jul. 17, 2000) and 09/330,251 (now issued as U.S. Pat. No. 6,106,595 on Aug. 22, 2000); the disclosures of which are herein incorporated by reference, and the like. As discussed above, the aqueous fluid may include a $CO_2$ hydrate promoter in certain embodiments. In certain embodiments, the aqueous fluid with which the multicomponent gaseous stream is contacted may include a $CO_2$ hydrate promoter, as described in U.S. Pat. No. 6,352,576, the disclosure of which is herein incorporated by reference.

In many embodiments, the multicomponent gaseous stream to be treated according to the subject methods is contacted with water that may contain $CO_2$ hydrate precursors or hydrate precursors of the promoter compounds. The nucleated water may or may not include a $CO_2$ hydrate promoter, as described above. The $CO_2$ nucleated water employed in these embodiments of the subject invention comprises dissolved $CO_2$ in the form of $CO_2$ hydrate precursors, where the precursors are in metastable form. These precursors may be composite for mixed hydrates containing both $CO_2$ and promoter molecules The mole fraction of $CO_2$ in the $CO_2$ nucleated water ranges from about 0.01 to 0.10, usually from about 0.02 to 0.08, more usually from about 0.02 to 0.03. The temperature of the $CO_2$ nucleated water typically ranges from about −1.5 to 10° C., preferably from about 0 to 5° C., and more preferably from about 0.5 to 3.0° C. In those embodiments in which an antifreeze is employed, the temperature often ranges from about −20 to −5° C.

$CO_2$ nucleated water employed in the subject methods as the selective liquid absorbent or adsorbent may be prepared using any convenient means. One convenient means of obtaining $CO_2$ nucleated water is described in U.S. Pat. No. 5,562,891, the disclosure of which is herein incorporated by reference. In this method $CO_2$ is first dissolved in water using any convenient means, e.g. bubbling a stream of $CO_2$ gas through the water, injection of $CO_2$ into the water under conditions of sufficient mixing or agitation to provide for homogeneous dispersion of the $CO_2$ throughout the water, and the like, where the $CO_2$ source that is combined with the water in this first stage may be either in liquid or gaseous phase. Where gaseous $CO_2$ is combined with water to make the $CO_2$ nucleated water, the gaseous $CO_2$ will typically be pressurized, usually to partial pressures ranging between about 6 to about 50 atm, more usually between about 10 to 25 atm. The $CO_2$ may be derived from any convenient source. In a preferred embodiment, at least a portion of the $CO_2$ is gaseous $CO_2$ obtained from a $CO_2$ hydrate slurry decomposition step, as described in greater detail below. The water in which the $CO_2$ is dissolved may be fresh water or salt water, e.g. seawater, or may contain $CO_2$ hydrate promoters. The temperature of the $CO_2$ nucleated water typically ranges from about $-1.5$ to $10°$ C., preferably from about 0 to $5°$ C., and more preferably from about 0.5 to $3.0°$ C. In those embodiments in which an antifreeze is employed, the temperature often ranges from about $-20$ to $-5°$ C.

The water that is used to produce the nucleated water may be obtained from any convenient source, where convenient sources include the deep ocean, deep fresh water aquifers, power-plant cooling ponds, and the like, and cooled to the required reactor conditions. In certain embodiments, the nucleated water may be recycled from a downstream source, such a clathrate slurry heat exchanger/decomposition source (as described in greater detail below) where such recycled nucleated water may be supplemented as necessary with additional water, which water may or may not be newly synthesized nucleated water as described above and may, or may not, contain dissolved $CO_2$ hydrate promoters.

The amount of $CO_2$ that is dissolved in the water is determined in view of the desired $CO_2$ mole fraction of the $CO_2$ nucleated water to be contacted with the gaseous stream. One means of obtaining $CO_2$ nucleated water having relatively high mole fractions of $CO_2$ is to produce a slurry of $CO_2$ clathrates and then decompose the clathrates by lowering the pressure and/or raising the temperature of the slurry to release $CO_2$ and regenerate a partially nucleated water stream. Generally, nucleated water having higher mole fractions of $CO_2$ are desired because it more readily accepts $CO_2$ absorption or adsorption and accelerates the formation of other hydrate compounds. By high mole fraction of $CO_2$ is meant a mole fraction of about 0.02 to 0.04, usually from about 0.025 to 0.035.

The production of $CO_2$ nucleated water may conveniently be carried out in a nucleation reactor. The reactor may be packed with a variety of materials, where particular materials of interest are those which promote the formation of $CO_2$ nucleated water with hydrate precursors and include: stainless steel rings, carbon steel rings, metal oxides and the like, to promote gas-liquid contact and catalyze hydrate formation. To ensure that the optimal temperature is maintained in the nucleation reactor, active coolant means may be employed. Any convenient coolant means may be used, where the coolant means will typically comprise a coolant medium housed in a container which contacts the reactor, preferably with a large surface area of contact, such as coils around and/or within the reactor or at least a portion thereof, such as the tail tube of the reactor. Coolant materials or media of interest include liquid ammonia, HCFCs, and the like, where a particular coolant material of interest is ammonia, where the ammonia is evaporated at a temperature of from about $-10$ to $-5°$ C. The surface of the cooling coils, or a portion thereof, may be coated with a catalyst material, such as an oxide of aluminum, iron, chromium, titanium, and the like, to accelerate $CO_2$ hydrate precursor formation. Additionally, hydrate crystal seeding or a small (1–3 atm) pressure swing may be utilized to enhance hydrate precursor formation.

In certain embodiments of the subject invention, the $CO_2$ nucleated water is prepared by contacting water (e.g. fresh or salt water) with high pressure, substantially pure $CO_2$ gas provided from an external high pressure $CO_2$ gas source. In this embodiment, the water is contacted with substantially pure $CO_2$ gas that is at a pressure that is about equal to or slightly above the initial $CO_2$ partial pressure in the multi-component gaseous stream pressure. As such, the pressure of the substantially pure $CO_2$ gas typically ranges in many embodiments from about 5 to 7 about atm above the multicomponent gaseous stream pressure ($CO_2$ overpressure stimulation of hydrate precursor and hydrate formation). By substantially pure is meant that the $CO_2$ gas is at least 95% pure, usually at least 99% pure and more usually at least 99.9% pure. Advantages realized in this embodiment include the production of $CO_2$ saturated water that comprises high amounts of dissolved $CO_2$, e.g. amounts (mole fractions) ranging from about 0.02 to 0.04, usually from about 0.025 to 0.035. Additional advantages include the use of relatively smaller nucleation reactors (as compared to nucleation reactors employed in other embodiments of the subject invention) and the production of more $CO_2$ selective nucleated water. In those embodiments where small nucleation reactors are employed, it may be desirable to batch produce the $CO_2$ saturated water, e.g., by producing the total requisite amount of $CO_2$ saturated water in portions and storing the saturated water in a high pressure reservoir. The $CO_2$ saturated water is readily converted to nucleated water, i.e. water laden with $CO_2$ hydrate precursors, using any convenient means, e.g., by temperature cycling, contact with catalysts, pressure cycling, etc. This pre-structuring of the hydrate formation water not only increases the kinetics of hydrate formation, but also reduces the exothermic energy release in the $CO_2$ hydrate reactor. This, in turn, reduces the cooling demands of the process and increases overall process efficiency.

As mentioned above, in this step of the subject methods, the multicomponent gaseous stream with hydrate promoters is contacted with the aqueous fluid, e.g., $CO_2$ nucleated water with or without hydrate promoters, under conditions of $CO_2$ clathrate formation, preferably under conditions of selective $CO_2$ clathrate formation. The aqueous fluid may be contacted with the gaseous stream using any convenient means. Preferred means of contacting the aqueous fluid with the gaseous stream are those means that provide for efficient removal, e.g., by absorption or adsorption which enhances hydrate formation, of the $CO_2$ from the gas through solvation of the gaseous $CO_2$ within the liquid phase or direct contact of the $CO_2$ gas with unfilled hydrate cages, which extract the $CO_2$ from the multicomponent gaseous stream. Means that may be employed include concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of fluidic Venturi reactor, sparger reactor, gas filter, spray, tray, or packed column reactors, and the like, as may be convenient.

Figure 3:
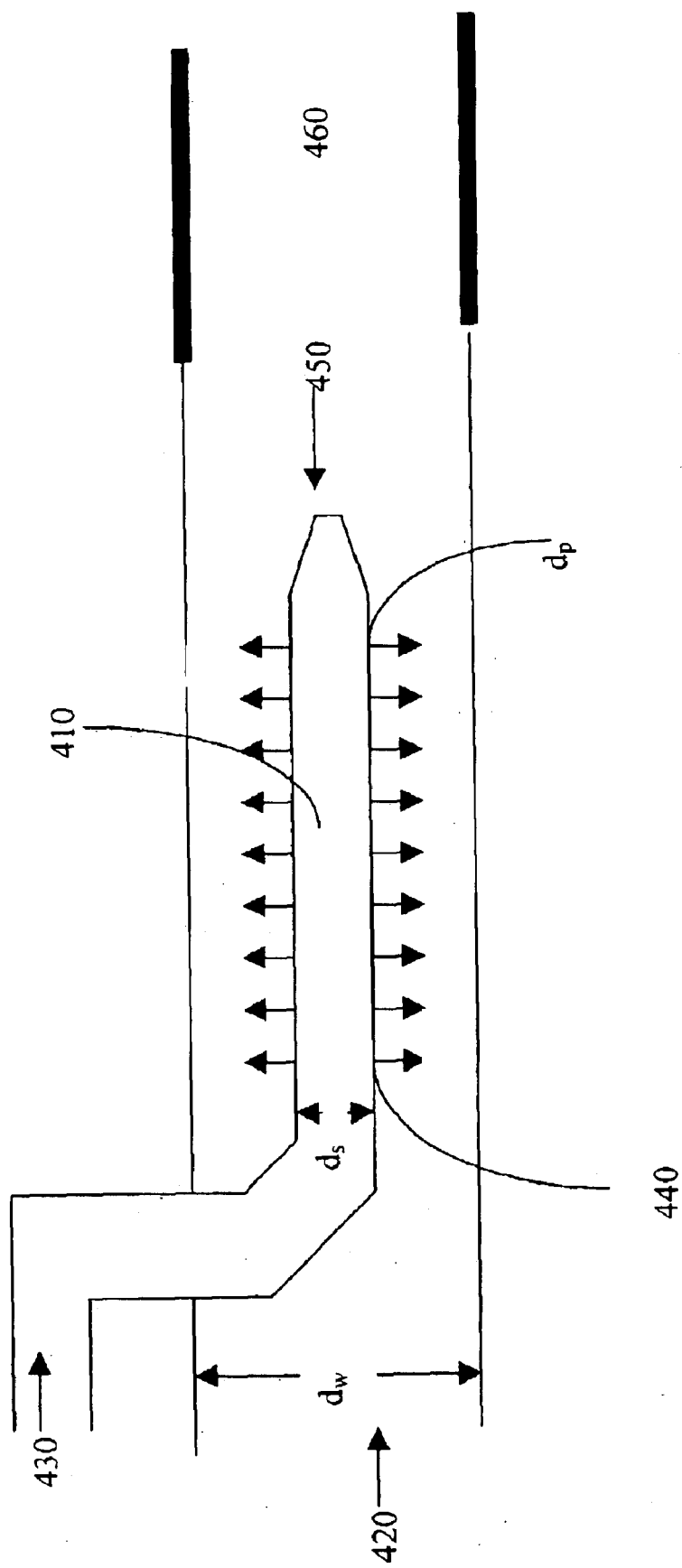
FIG. 3 provides an illustration of a sparger reactor embodiment according to the present invention.

In certain embodiments of interest, contact is achieved through use of a sparger reactor. In this embodiment, a sparger contactor is employed for contacting the multicomponent gaseous stream, containing $CO_2$, with the recycled nucleated or partially nucleated water stream. A representative sparger contactor is shown in FIG. 3. In the sparger contactor shown in FIG. 3, a perforated injection head 410, is located on or near the centerline of the partially or fully nucleated water stream 420. The multicomponent gaseous stream (430), containing $CO_2$, is brought into contact with the water by injecting the multicomponent gaseous stream into the water stream, e.g., radially, at an angle facing upstream into the water stream, etc. This contact approach produces a well mixed gas-liquid stream, which is desirable for a number of reasons, including but not limited to: a) forming hydrate precursors; b) completing the $CO_2$ saturation of the water, i.e., forming fully nucleated water; 3) feeding a well mixed gas-liquid stream into the tail tube (Hydrate Formation Tubular Reactor); etc.

The injection ports 440 of the sparger contactor may have any of the following characteristics: 1) The sparger tube internal diameter, $d_s$, may be uniform or tapered from the feed end to the termination of the sparger tube; 2) the sparger tube injection ports 440 may have internal diameters, $d_p$, that are the same or vary along the length of the sparger tube, such that $d_p$ among the injection ports may be uniform or non-uniform; 3) each set of injection ports may be at the same circumferential position of the sparger tube; or may be scattered circumferentially to enhance mixing of the multicomponent gaseous stream and the partially or fully nucleated water stream; 4) the sparger tube may include internals to further enhance mixing of the multicomponent gaseous stream and the partially or fully nucleated water stream; 5) the length of the sparger contactor tube can be established, optimally for each multicomponent gaseous stream depending upon the gas': a) composition, b) operating pressure, c) system temperature, and d) the multicomponent gaseous throughput and the partially or fully nucleated water throughput; 6) the terminal gaseous injection port 450 may have an active, varying diameter to control gaseous flows within the sparger tube.

Without restricting the range of applicability of this sparger contactor, the expected size range of a full scale or pilot scale unit may vary from an 0.25 inch (0.635 cm) to 6.0 inches (15.24 cm.) in internal diameter and have lengths of 0.5 in. (1.27 cm.) to 20 inches (50.8 cm.). Each Injection Port may have an internal diameter in the range from 1/32 in. (0.079 cm.) to ½ in. (1.27 cm.), depending upon the throughput, operating pressure, gas composition, etc. of the multicomponent gaseous stream. The terminal Gaseous Injection Port may have an active varying diameter to control flows within the Sparger Tube.

Some of the advantages of this Sparger Contactor include:
1) The primary water carrying tube has a constant internal diameter, $d_w$; therefore potential hydrate plugging of the contactor and tail tube tubular reactor 460 is greatly reduced from other injector types, e.g., a Venturi type injector;
2) The sparger contactor may serve as both a nucleation reactor and a hydrate precursor reactor by controlling multicomponent gaseous flows thru each of the ports along the length of the sparger tube;
3) Gas-Liquid mixing may be greatly enhanced, as the contactor is scaled up to commercial scale, since the multicomponent gaseous stream is injected, at or near, right angles to the water stream;
4) The sparger contactor can be readily scaled to meet full scale operating requirements;
5) There should be less opportunity for the injection ports to plug as the multicomponent gaseous stream exits the sparger tube.
6) The sparger tube terminal port at the end of the sparger tube can have a controlled, varying diameter, i.e., active, modulated control of the injection diameter in real time; thereby permitting good control of the multicomponent gaseous flow throughout the length of the Sparger Tube;
7) This Sparger Contactor also simplifies the introduction of the multicomponent gaseous stream into partially or fully saturated water streams, containing $CO_2$ hydrate promoters, e.g., organic salts, dissolved in the water.

Generally, contact between the multicomponent gaseous stream and the aqueous fluid is carried out in a hydrate or clathrate formation reactor. The reactor may be fabricated from a variety of materials, where particular materials of interest are those which catalyze the formation of $CO_2$ clathrates or hydrates and include: stainless steel, carbon steel, and the like. The reactor surface, or a portion thereof, may be coated with a catalyst material, such as an oxide of aluminum, iron, chromium, titanium, and the like, to accelerate $CO_2$ hydrate formation. To ensure that the optimal temperature is maintained in the hydrate formation reactor, active coolant means may be employed. Any convenient coolant means may be used, where the coolant means will typically comprise a coolant medium housed in a container which contacts the reactor, preferably with a large surface area of contact, such as coils around or within the reactor or at least a portion thereof, such as the exit plenum and tail tube of the reactor. Coolant materials or media of interest include ammonia, HCFCs and the like, where a particular coolant material of interest is ammonia, where the ammonia is maintained at a temperature of from about −10 to −5° C. Where the reactor comprises gas injectors as the means for achieving contact to produce clathrates, the reactor may comprise 1 or a plurality of such injectors. In such reactors, the number of injectors will range from 1 to about 20 or more, where multiple injectors provide for greater throughput and thus greater clathrate production. Specific examples of various reactors that may be employed for clathrate production are provided in U.S. application Ser. No. 09/067,937, the disclosure of which is herein incorporated by reference. In certain embodiments, the clathrate formation reactor is a finned tubular reactor, as described in greater detail below.

The clathrate formation conditions under which the gaseous and liquid phase streams are contacted, particularly the temperature and pressure, may vary but will preferably be selected so as to provide for the selective formation of $CO_2$ clathrates, limiting the clathrate formation of other components of the multi-component gaseous stream. Generally, the temperature at which the gaseous and liquid phases are contacted will range from about −1.5 to 10° C., usually from about −0 to 5° C., more usually from about 0.5 to 3.0° C. The total pressure of the environment in which contact occurs, e.g., in the reactor in which contact occurs, may range from about 1 to about 100 atm, usually from about 10 to about 60 atm. The $CO_2$ partial pressure at which contact occurs generally does not exceed about 70 atm, and usually does not exceed about 40 atm. The minimum $CO_2$ partial pressure at which hydrates form in the presence of $CO_2$ hydrate promoters is generally less than about 10 atm, usually less than about 8 atm and may be as low as 2 or 1 atm or lower.

A feature of the subject methods is that, at some point in the process up to and including during contact of the gaseous stream with the aqueous fluid an additional amount of gaseous $CO_2$ hydrate promoter is introduced into the multicomponent gaseous stream. For example, in certain embodiments, an additional amount of $CO_2$ hydrate promoter is introduced into the multicomponent gaseous stream prior to its introduction into the hydrate formation reactor, or at the entry of the stream into the reactor. In other embodiments, an additional amount of gaseous $CO_2$ hydrate promoter may be contacted with the multicomponent gaseous stream in the hydrate formation reactor. A common feature of the subject methods of this embodiment is that the additional gaseous $CO_2$ hydrate promoter is contacted with (i.e., introduced into) the multicomponent gaseous stream at a time prior to the output of the hydrate formation reactor.

In certain embodiments, the additional gaseous $CO_2$ hydrate promoter is contacted with the multicomponent gaseous stream in the hydrate reactor at a point in the process where the $CO_2$ concentration of the multicomponent gaseous stream is within a certain percentage of its minimum hydrate formation pressure (MHFP), where in many embodiments the additional $CO_2$ hydrate promoter is introduced into the multicomponent gaseous stream when the actual $CO_2$ concentration is within about 10 psia, usually within about 5 psia of its MHFP. In many such embodiments, the gaseous $CO_2$ hydrate promoter is contacted with the multicomponent gaseous stream at a location (or locations) in hydrate reactor where the $CO_2$ hydrate promoter only fraction is increased from about 0.01 to about 0.10, usually from about 0.02 to about 0.08. In such situations, a feature is that the overall partial pressure of the gaseous $CO_2$ hydrate promoter in the multicomponent gaseous stream following contact with the additional gaseous $CO_2$ hydrate promoter, is increased (by the addition of the additional gaseous $CO_2$ hydrate promoter) by an amount of from about 4 to about 20 psia, usually from about 5 to about 15 psia to an overall partial pressure of gaseous $CO_2$ hydrate promoter of from about 10 to about 200 psia, often from about 12 to about 160 psia.

The source of the additional gaseous $CO_2$ hydrate promoter may vary, but is a recycle source in many embodiments. Specifically, in many embodiments of interest, the source of additional gaseous $CO_2$ hydrate promoter is a recycling source that recycles additional gaseous $CO_2$ hydrate promoter from an output stream of the hydrate formation reactor.

Turning back to the overall process of selective $CO_2$ removal of the invention, upon contact of the gaseous stream with the aqueous fluid, $CO_2$ is selectively removed from the gaseous stream and $CO_2$ hydrates are formed as the $CO_2$ reacts with the $CO_2$ nucleated water liquid phase containing $CO_2$ hydrate precursors, with or without $CO_2$ hydrate promoters. The removed $CO_2$ is concomitantly fixed as solid $CO_2$ clathrates in the liquid phase slurry. Contact between the gaseous and liquid phases results in the production of a $CO_2$ depleted multicomponent gaseous stream and a slurry of $CO_2$ clathrates. In the $CO_2$ depleted multicomponent gaseous stream, the $CO_2$ concentration is reduced by at least about 50%, usually by at least about 70%, and more usually by at least about 90%, as compared to the untreated multicomponent gaseous stream. In other words, contact of the multicomponent gaseous stream with the $CO_2$ nucleated water results in at least a decrease in the concentration of the $CO_2$ of the gaseous phase, where the decrease will be at least about 50%, usually at least about 70%, more usually at least about 90%. In some instances the concentration of $CO_2$ in the gaseous phase may be reduced to the level where it does not exceed 5% (v/v), such that the treated gaseous stream is effectively free of $CO_2$ solute gas. As such, many embodiments of the subject methods provide for a "single-pass" efficiency of $CO_2$ removal of at least about 50%, and often at least about 75 or 90% or higher.

As discussed above, the $CO_2$ removed from the multicomponent gaseous stream is concomitantly fixed in the form of stable $CO_2$ clathrates. Fixation of the $CO_2$ in the form of stable $CO_2$ clathrates results in the conversion of the aqueous fluid to a slurry of $CO_2$ clathrates. The slurry of $CO_2$ clathrates produced upon contact of the gaseous stream with the aqueous fluid comprises $CO_2$ stably fixed in the form of $CO_2$ clathrates and water. Typical mole fractions of $CO_2$ in stable clathrates are 0.12 to 0.15.

Concurrently, as gaseous $CO_2$ forms stable clathrates, promoter compounds, e.g., $H_2S$ or $SO_2$, also form stable clathrates, either separately or, more likely, as mixed clathrates with the $CO_2$. This is particularly likely in a mixed gaseous stream with $CO_2$ concentrations which are 20 to 40 times the concentration of the gaseous promoter compound(s). Therefore, if the promoter compound(s) is to be reduced to further reduce the $CO_2$ MHFP, it may be separated from the clathrate slurry fluid gas stream or from the hydrogen or other product stream.

Methods of the subject invention generally also include the separation of the treated gaseous phase from the $CO_2$ clathrate slurry. As convenient, the gaseous phase may be separated from the slurry in the reactor or in a downstream gas-liquid separator. Any convenient gas-liquid phase separation means may be employed, where a number of such means are known in the art. In many preferred embodiments, the gas-liquid separator that is employed is a horizontal separator with one or more, usually a plurality of, gas off takes on the top of the separator. The subject invention provides for extremely high recovery rates of the multicomponent gaseous stream. In other words, the amount of non-$CO_2$ gases removed from the multicomponent gaseous stream following selective $CO_2$ extraction according to the subject invention are extremely low. For example, where the multicomponent gaseous stream is a shifted synthesis gas stream, the amount of combustible gases (i.e. $H_2$, $CH_4$ and CO) recovered is above 99%, usually above 99.2% and more usually above 99.5%, where the amount recovered ranges in many embodiments, from about 99.6 to 99.8%.

Where it is desired to sequester the $CO_2$ clathrates produced by the subject method, the resultant $CO_2$ clathrate slurry may be disposed of directly as is known in the art, e.g., through placement in gas wells, the deep ocean or freshwater aquifers, and the like, or subsequently processed to separate the clathrates from the remaining nucleated water, where the isolated clathrates may then be disposed of according to methods known in the art and the remaining nucleated water recycled for further use as a selective $CO_2$ absorbent in the subject methods, and the like.

Where desired, $CO_2$ gas can easily be regenerated from the clathrates, e.g., where high pressure $CO_2$ is to be a product or further processed for sequestration, using known methods. The resultant $CO_2$ gas may be disposed of by transport to the deep ocean or ground aquifers, or used in a variety of processes, e.g., enhanced oil recovery, coal bed methane recovery, or further processed to form metal carbonates, e.g., $MgCO_3$, for fixation and sequestration.

In certain embodiments, the $CO_2$ hydrate slurry is treated in a manner sufficient to decompose the hydrate slurry into $CO_2$ gas and $CO_2$ nucleated water, i.e., it is subjected to a decomposition step. Typically, the $CO_2$ hydrate slurry is thermally treated, e.g., flashed, where by thermally treated is meant that temperature of the $CO_2$ hydrate slurry is raised in sufficient magnitude to decompose the hydrates and produce $CO_2$ gas. Typically, the temperature of the $CO_2$ hydrate slurry is raised to a temperature of between about 40 to about 50° F., at a pressure ranging from about 3–20 to 200 atm, usually from about 30 to about 500 atm. One convenient means of thermally treating the $CO_2$ hydrate slurry is in a counterflow heat exchanger, where the heat exchanger comprises a heating medium in a containment means that provides for optimal surface area contact with the clathrate slurry. Any convenient heating medium may be employed, where specific heating media of interest include: ammonia, HCFC's and the like, with ammonia vapor at a temperature ranging from 20 to 40° C. being of particular interest. Preferably, the ammonia vapor is that vapor produced in cooling the nucleation and/or hydrate formation reactors, as described in greater detail in terms of the figures.

A variety of multicomponent gaseous streams are amenable to treatment according to the subject methods. Multicomponent gaseous streams that may be treated according to the subject invention will comprise at least two different gaseous components and may comprise five or more different gaseous components, where at least one of the gaseous components will be $CO_2$, where the other component or components may be one or more of $N_2$, $O_2$, $H_2O$, $CH_4$, $H_2$, CO and the like, as well as one or more trace gases, e.g. $H_2S$, $SO_2$, etc. The total pressure of the gas will generally be at least about 1 atm, usually at least about 40 atm and more usually at least about 70 atm. The mole fraction of $CO_2$ in the multicomponent gaseous streams amenable to treatment according to the subject invention will typically range from about 0.10 to 0.90, usually from about 0.15 to 0.70, more usually from about 0.30 to 0.60. The partial pressure of $CO_2$ in the multicomponent gaseous stream need not be high, and may be as low as 10 atm or lower, e.g. 5 or 1 atm or lower, with appropriate promoters present. By controlling the clathrate formation conditions, the $CO_2$ hydrate formation precursors and promoters, nucleated water properties, and providing intimate contact between the $CO_2$ nucleated water and the multicomponent gas, the $CO_2$ separation can be controlled to provide for the selective formation of $CO_2$ clathrates, e.g., through use of highly nucleated water containing hydrate precursors and promoters, and perhaps dissolved or dispersed catalysts, which further aids the selective $CO_2$ hydrate formation from the multicomponent gaseous stream and increases $CO_2$ separation efficiency. The particular conditions which provide for the best selectivity with a particular gas can be determined empirically by those of skill in the art. Multicomponent gaseous streams (containing $CO_2$) that may be treated according to the subject methods include both reducing, e.g., syngas, shifted syngas, natural gas, and hydrogen and the like, and oxidizing condition streams, e.g. flue gases from combustion. Particular multicomponent gaseous streams of interest that may be treated according to the subject invention include: oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Multicomponent gaseous mediums in which the partial pressures of each of the components are suitable for selective $CO_2$ hydrate formation according to the subject invention may be treated directly without any pretreatment or processing. For those multicomponent gaseous mediums that are not readily suitable for treatment by the subject invention, e.g., in which the partial pressure of $CO_2$ is too low and/or the partial pressure of the other components are too high, may be subjected to a pretreatment or preprocessing step in order to modulate the characteristics of the gaseous medium so that is suitable for treatment by the subject method. Illustrative pretreatment or preprocessing steps include: temperature modulation, e.g., heating or cooling, decompression, compression, incorporation of additional components, e.g., $H_2S$ and other hydrate promoter gases, and the like.

Systems

As summarized above, also provided are systems for use in practicing the subject methods. A feature of the subject systems is that they include at least one of: (a) a gaseous $CO_2$ hydrate promoter recycle element; and (b) a finned tubular reactor. In certain embodiments, the subject systems include either a gaseous $CO_2$ hydrate promoter recycle element or a finned tubular reactor. In yet other embodiments, the subject systems include both a gaseous $CO_2$ hydrate promoter recycle element and a finned tubular reactor.

The invention will now be further described in terms of representative embodiments of the subject systems. One representative embodiment of the subject systems is shown schematically in FIG. 1. FIG. 1 provides a schematic flow diagram of a system 10 in which gaseous $CO_2$ hydrate promoter is selectively removed from the product stream produced by the hydrate formation reactor and recycled back to the hydrate formation reactor. In FIG. 1, the multicomponent gaseous stream 1, e.g., shifted syngas (made up of $H_2$, $CO_2$, $H_2S$, and other gases) and $CO_2$ nucleated water 2 are combined in the $CO_2$ hydrate reactor 3 under conditions sufficient to produce a $CO_2$ hydrate slurry and a $CO_2$ depleted multicomponent gaseous stream 5. The reactor is cooled with an ammonia coolant 7 which vaporizes in the cooling process. The ammonia vapor is further compressed and the ammonia flows to a condenser or a $CO_2$ clathrate heat exchanger. The $CO_2$ hydrate slurry 4 and other gases 5 are then separated in the slurry/gas separator 6. The slurry is then sent to the $CO_2$ clathrate heat exchanger 8 where the slurry is thermally treated to produce $CO_2$ gas and nucleated water and, optionally condensed ammonia liquid in systems equipped for such feature. In such systems, preferably, the compressed ammonia vapor produced from cooling the $CO_2$ hydrate reactor is used to thermally treat, at least in part, the $CO_2$ hydrate slurry in the heat exchanger, as this greatly reduces parasitic energy loss. The resultant $CO_2$ nucleated water 9 is then chilled, e.g. using cooled ammonia 11, and returned to the nucleation reactor 12, where it is combined with chilled makeup water and/or a recycled stream of primarily $CO_2$ and small amounts of promoter compounds 13 (which may be produced from the heat exchanger exhaust $CO_2$) to make $CO_2$ nucleated water of sufficiently high $CO_2$ content to selectively remove $CO_2$ from additional multicomponent gas. The $CO_2$ gas 15 produced from the heat exchanger, which includes gaseous $CO_2$ hydrate promoter (e.g., $H_2S$) is then sent to gaseous $CO_2$ hydrate promoter recovery element 20. Gaseous $CO_2$ hydrate promoter recovery or recycling element 20 includes gaseous $CO_2$ absorber 22 into which gas 15 is introduced, where absorber included a gaseous $CO_2$ hydrate promoter absorbent that selectively removes at least a portion of the gaseous $CO_2$ hydrate promoter from the gas 15 and fixes it into a liquid phase. The output of the recycler 20 includes a product $CO_2$ gas 24 that may include a reduced amount of gaseous $CO_2$ hydrate promoter. The product gas 24 can be disposed of, e.g., by deposition in the deep ocean or ground aquifers or used in subsequent processes, e.g., enhanced oil recovery or coal bead methane recovery. The output of recycler 20 also includes a gaseous $CO_2$ promoter rich fluid absorbent 26. Fluid absorbent 26 is sent to a separator element 28, such as a steam separator, where the output of the separator is lean fluid absorbent 29 and gaseous $CO_2$ hydrate promoter product gas 30, which is recycled back to the hydrate formation reactor 2.

As mentioned above, a certain feature of certain embodiments of the subject systems is the presence of a finned tubular hydrate formation reactor (element 2 in FIG. 1). By finned tubular reactor is meant a tubular reactor that includes one or more "fins" or analogous structures that serve to increase the surface area of the inner surface and of the tubular reactor, typically by a factor of at least about 5, including by at least about 6, such as by at least about 10, as compared to a tubular reactor of similar dimension without "fins" or analogous structures. By tubular reactor is meant a reactor that has a tubular configuration, where the length of the reactor is longer that the inner diameter, where the ratio of these two dimensions typically ranges from about 2000 to about 1000, usually from about 1500 to about 1200. In certain embodiments, the length of the tubular hydrate formation reactor ranges from about 100 to about 500 ft, such as from about 200 to about 400 ft, and the inner diameter ranges from about 1 to about 4 inches, such as from about 2 to about 3 inches.

Figure 2A:
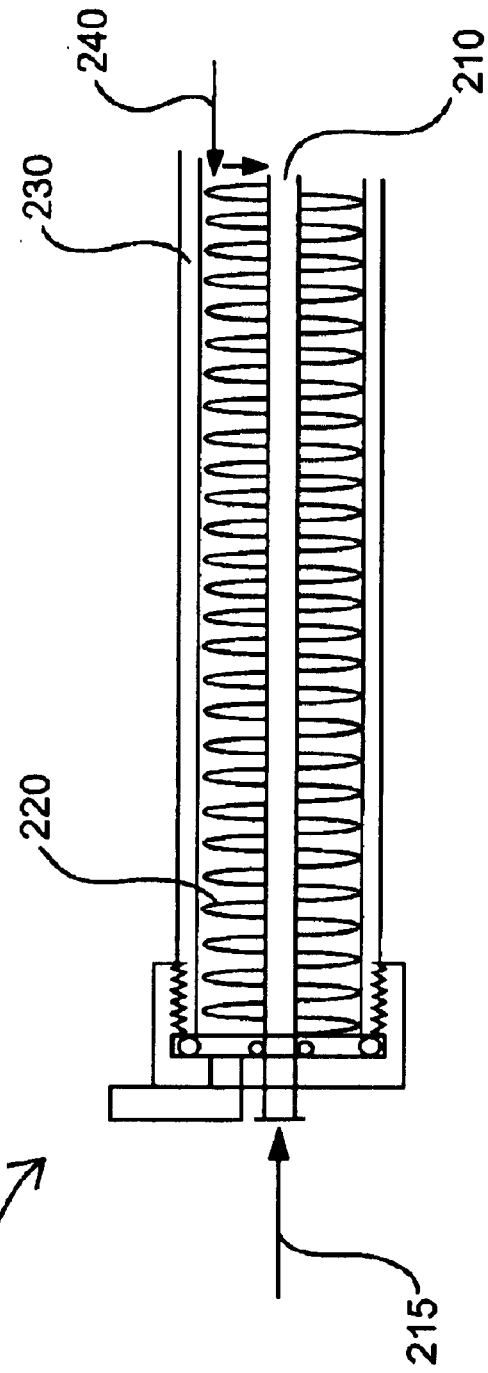
FIGS. 2A and 2B provide illustrations of two different finned tubular reactors found in certain embodiments of the systems according to the present invention.
Figure 2B:
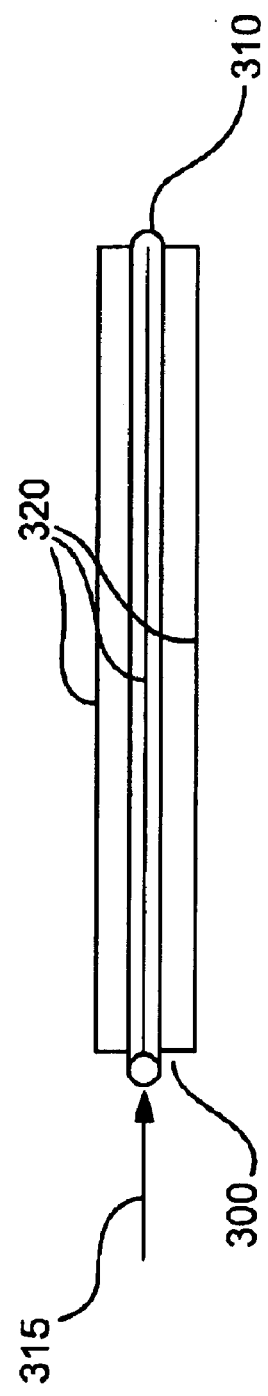

The "fin" structures of the subject tubular reactors may take on a variety of different configurations. Two configurations of particular interest are longitudinal and helical configurations, where representative tubular reactors for each of these embodiments are shown in FIGS. 2A and 2B, respectively. Typically the fin structures of these embodiments have heights of from about 0.25 to about 0.5 of the inner diameter of the tubular reactor, and thicknesses of between about 0.05 and about 0.1 of the inner diameter of the tubular reactor.

FIG. 2A provides a schematic representation of an embodiment of helical fin tubular hydrate formation reactor which may be present in systems according to the subject invention. In FIG. 2A, reactor 200 includes tubular reactor core 210 having entrance 215 and helical fins 220. The core/fin structure is encased in outer tubular housing 230, where the space between the outer surface of the core structure and the inner surface of the casing is filled with a coolant medium 240. Multicomponent gaseous stream comprising $CO_2$ enters reactor core 220 at entrance 215 where it is contacted with $CO_2$ nucleated water, or non-nucleated water for $CO_2$ hydrate formation.

FIG. 2B provides a schematic representation of another embodiment of a finned tubular hydrate formation reactor in which the "fin" structures are longitudinal finned structures. As shown in FIG. 2B, reactor 300 has core reactor 310 and multiple longitudinal fins 320, which may be contacted with coolant during use. Also shown is core reactor entrance 315.

The addition of external cooling fins to the tubular reactor permit a closer approach of the process fluid temperature to that of the coolant. By controlling the coolant temperature to a small range, e.g., by employing a boiling liquid coolant, such as ammonia, near 0.5–1.0° C., hydrates are formed at the lowest temperature possible, without forming water ice. Control of the approach temperature in the process fluid, but using finned tubular reactors, can reduce $CO_2$ MHFP by 1 to 2 atmospheres, or 15–30 psia.

The following examples are offered by way of illustration and not by way of limitation.

EXPERIMENTAL

A. Gaseous Promoter Recycle

A $CO_2$ multicomponent gas treatment system 10 according to the subject invention that includes an $H_2S$ separator element 20 and recycle function is shown in the overall block flow diagram of FIG. 1. The $H_2S$ recycle option requires the addition of two (2) additional process steps compared to prior art systems that lack such an element, namely 1) Selective absorption of $H_2S$ in an absorber column 22 and 2) Steam stripping to regenerate the $H_2S$ and the lean solvent used to absorb the $H_2S$. The $H_2S$ rich gas stream 30 including small amounts of $CO_2$, is recycled to the CO2 Hydrate Formation Reactor 2.

The $H_2S$ rich gas stream may be introduced to the reactor at various locations, depending upon the amount of $CO_2$ removal required from the shifted syngas feed stream. Specifically, the $H_2S$ may be: a) mixed with the shifted synthesis gas (Syngas) prior to the introduction to the $CO_2$ Hydrate Formation Reactor or b) at any convenient location in the tubular reactor (tail tube).

The key effect of the $H_2S$ gas is to reduce the $CO_2$ minimum hydrate formation pressure (MHFP), and, thereby, increase the amount of $CO_2$ in the hydrate phase. Thus, the $H_2S$ Promoter increases the amount of $CO_2$ transferred from the shifted synthesis gas to the hydrate phase, increasing $CO_2$ Separation Ratios. Table 1 shows the theoretical and experimental effect of the $H_2S/CO_2$ Composition on the $CO_2$ MHFP.

TABLE 1

Effect of $H_2S/CO_2$ Composition on
$CO_2$ Minimum Hydrate Formation Pressure (MHFP)
(Theoretical and Experimental)

| Gas Mix | Component | Composition | Theoretical (K Value) MHFP (psia) | Exp. MHFP (psia) |
|---|---|---|---|---|
| 1 | $CO_2$ | 0.99 | 187 | 169 |
|   | $H_2S$ | 0.01 | | |
| 2 | $CO_2$ | .97 | 173 | 126 |
|   | $H_2S$ | .03 | | |
| 3 | $CO_2$ | 0.95 | 155 | 107 |
|   | $H_2S$ | 0.05 | | |
| 4 | $CO_2$ | 0.90 | 133 | 84 |
|   | $H_2S$ | 0.10 | | |

As may be seen from Table 1, increased $H_2S$ compositions substantially decrease the $CO_2$ MHFP at relatively low concentrations of H2S, e.g., below 10 mole percent in the mixed gas.

Table 2 shows a typical example of the impact of the $H_2S$ partial pressure on the $CO_2$ MHFP, depending on the degree of depletion of the $H_2S$ from the mixed gas stream. For example, if the $H_2S$ concentration can be maintained at a partial. pressure of 8.0 psia, as the $CO_2$ is depleted the $CO_2$ Separation Ratio can be increased from approximately 61% ($CO_2$ MHFP–206 psia) to 77% ($CO_2$ MHFP+135 psia). Of course, this is exactly the effect which results by utilizing $H_2S$ recycle.

TABLE 2

Estimated $CO_2$ Separation Efficiency
For Various Final $H_2S$ Partial Pressures
In the Shifted Synthesis Gas
(1000 psia SSG, 34° F.)

| Initial Partial Pressure | | Final Partial Pressures (psia) | | $CO_2$ Separation Efficiency |
|---|---|---|---|---|
| $CO_2$ | $H_2S$ | $CO_2$ | $H_2S$ | |
| 400 | 11 | 206 | 0 | 0.61 |
| | | 197 | 0.5 | 0.63 |
| | | 180 | 2.5 | 0.67 |

TABLE 2-continued

Estimated $CO_2$ Separation Efficiency
For Various Final $H_2S$ Partial Pressures
In the Shifted Synthesis Gas
(1000 psia SSG, 34° F.)

| Initial Partial Pressure | | Final Partial Pressures (psia) | | $CO_2$ Separation Efficiency |
|---|---|---|---|---|
| $CO_2$ | $H_2S$ | $CO_2$ | $H_2S$ | |
| | | 158 | 5.0 | 0.72 |
| | | 150 | 6.0 | 0.74 |
| | | 135 | 8.0 | 0.77 |
| | | 110 | 11.0 | 0.82 |

Since the initial $CO_2$ partial pressure in the multi-component gas stream is always much greater than its MHFP, as a pure compound, the above indicates that the $CO_2$ depletes more rapidly than the Promoter, $H_2S$, until the $CO_2$ approaches the pure $CO_2$ MHFP. Thus, the mixed gas stream containing $CO_2$ and $H_2S$ becomes richer in $H_2S$, as the $CO_2$ is preferentially removed. This, of course, has the same effect as $H_2S$ recycle, i.e., driving the CO2 MHFP to lower values.

The above demonstrates that it is more effective, e.g., optimal, to introduce the recycled $H_2S$ into the mixed gas stream, as the $CO_2$ approaches its MHFP. Table 3 shows the predicted impact on $CO_2$ MHFP, for $H_2S$ recycle of 50% and 100% of its initial level in the shifted syngas, being introduced either in the entrance region ($CO_2$ partial pressure= 400 psia) or at an optimum location ($CO_2$ partial pressure= 200 psia).

TABLE 3

Example Effect of $H_2S$ Recycle at Optimum $CO_2$
Partial Pressure in Shifted Synthesis Gas
(1000 psia SSG, 34° F.)

| Gas Partial Pressure (psia) | | $CO_2/$ $H_2S$ Mole Ratio | $CO_2$ Minimum Hydrate Formation Pressure (psia) | % $H_2S$ Recycle | Separation Ratio |
|---|---|---|---|---|---|
| $CO_2$ (at $H_2S$ recycle location) | $H_2S$ | | | | |
| 400 | 11 | 36 | 129 | 0 | 0.78 |
| 400 | 16.5 | 24 | 113 | 50 | 0.81 |
| 400 | 22 | 18 | 106.5 | 100 | 0.82 |
| 200 | 11[1] | 18 | 106.5 | 0 | 0.82 |
| 200 | 16.5[1] | 12 | 92.7 | 50 | 0.85 |
| 200 | 22[1] | 9 | 84 | 100 | 0.86 |

[1]Assumes No $H_2S$ Depletion Until $CO_2$ Reaches Pure $CO_2$ MHFP

It is clear from Tables 3 and 2 that optimal $H_2S$ recycle can increase $CO_2$ Separation Ratios from approximately 78% to 86%, a nearby 10% improvement in performance. Thus, $H_2S$ recycle can be a very effective method of increasing $CO_2$ Separation Ratios, without introducing any new Promoter species in either the gaseous or liquid phases.

As shown in FIG. 1, the recycle $H_2S$ is generated from the hydrate slurry flash reactor off gas, containing primarily $CO_2$, but also most of the $H_2S$ from the shifted synthesis gas. This off gas composition, without $H_2S$ recycle, will be in the range of 96% $CO_2$, 2% $H_2S$ to 96% $CO_2$, 4% $H_2S$, depending on the actual Separation Ratios for CO2 and H2S from the multi-component gaseous stream.

This gas stream is fed to the $H_2S$ absorber, where an organic amine of glycol solution, preloaded with $CO_2$ to inhibit $CO_2$ uptake, is used to absorb the $H_2S$, preferentially from the $CO_2/H_2S$ feed gas. Depending upon the amount of $H_2S$ recycle, 50% or 100%, the $CO_2/H_2S$ hydrate composition will decrease to 93% $CO_2$, 7% $H_2S$ and 90% CO2, 10% $H_2S$, respectively.

This product gas, then represents the composition of the gas stream which must be compressed and sequestered. If the final sequestration in the ocean, ground aquifers, or oil, gas, or coal bed methane recovery sites, will permit this $H_2S$ concentration, no further processing is required. If the sequestration requirements necessitate lower $H_2S$ concentrations, a portion or all of the $H_2S$ must be removed from the $CO_2/H_2S$ gas stream, in a manner similar to that used to produce the recycle $H_2S$, and, then, treated in a standard Claus plant to produce elemental sulfur, as is done in conventional coal gasification plants.

B. Finned Tubular Reactor

The $CO_2$ hydrate formation-process is very exothermic, with hydrate heats of formation being 57–70 kilojoules per mole of $CO_2$ (558–685 Btu per pound of $CO_2$). Experimentally, it has been determined that tubular reactor dimensions, particularly lengths, are determined by process heat transfer limitations, not reaction kinetics or mixing. As a consequence, the experimental tubular reactor has been designed with a helical fin cooling configuration.

The subject methods and systems provide for a number of advantages. First, the subject methods provide for extremely high $CO_2$ removal rates and separation ratios from the multicomponent gaseous stream. In those embodiments of the subject invention where both promoter recycle and a finned tubular hydrate formation reactor are employed, the $CO_2$ Separation Ratio can be increased to. nearly 89%, for the example cited above. Thus, systems according to the subject invention can provide very significant process performance improvements, as compared to other prior art systems. In addition, costs of removal may be reduced as the percent removal of $CO_2$ is increased. As such, the subject invention represents a significant contribution to the art.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for removing $CO_2$ from a multicomponent gaseous stream to produce a $CO_2$ depleted gaseous stream, said method comprising:
   (a) providing a multicomponent gaseous stream comprising a gaseous $CO_2$ hydrate promoter;
   (b) contacting said multicomponent gaseous stream with an aqueous fluid under conditions sufficient to produce $CO_2$ hydrates, whereby $CO_2$ is removed from said gaseous stream by said aqueous fluid and concomitantly fixed as $CO_2$ clathrates upon said contacting to produce a $CO_2$ depleted gaseous stream and a $CO_2$ clathrate slurry; and
   (c) separating said $CO_2$ depleted gaseous stream from said $CO_2$ clathrate slurry to remove $CO_2$ from said multi-component gaseous stream;

with the proviso that said method is further characterized by at least one of the following features:

(i) gaseous $CO_2$ hydrate promoter produced from a recycled source is introduced into said multicomponent gaseous stream comprising said $CO_2$ hydrate promoter at a time prior to said separating step (c); and (ii) said contacting step (b) occurs in a finned tubular reactor.

2. The method according to claim 1, wherein gaseous $CO_2$ hydrate promoter produced from a recycled source is introduced into said multicomponent gaseous stream comprising said $CO_2$ hydrate promoter at a time prior to said separating step (c).

3. The method according to claim 1, wherein said contacting step (b) occurs in a finned tubular reactor.

4. The method according to claim 1, wherein:

(i) gaseous $CO_2$ hydrate promoter produced from a recycled source is introduced into said multicomponent gaseous stream comprising said $CO_2$ hydrate promoter at a time prior to said separating step (c); and (ii) said contacting step (b) occurs in a finned tubular reactor.

5. The method according to claim 1, wherein said finned tubular reactor comprises a tubular reactor with a helical fin structure.

6. The method according to claim 1, wherein said finned tubular reactor comprises a tubular reactor with a longitudinal fin structure.

7. The method according to claim 1, wherein said aqueous fluid is $CO_2$ nucleated water.

8. The method according to claim 1, wherein said gaseous $CO_2$ hydrate promoter in said multicomponent gaseous stream is a low molecular weight compound.

9. The method according to claim 8, wherein said low molecular weight compound is a sulfur-containing compound.

10. The method according to claim 9, wherein said sulfur containing compound is selected from the group consisting of $H_2S$, $SO_2$ and $CS_2$.

11. A system for selectively removing $CO_2$ from a multicomponent gaseous stream to produce a $CO_2$ depleted gaseous stream, said system comprising:

(a) a hydrate formation reactor;

(b) a gaseous $CO_2$ hydrate promoter recovery element for recovering gaseous $CO_2$ hydrate promoter from a product stream from said reactor; and (c) a gaseous $CO_2$ hydrate promoter recycling element for recycling recovered gaseous $CO_2$ hydrate promoter to said hydrate formation reactor or an input stream thereof.

12. The system according to claim 11, wherein said gaseous $CO_2$ hydrate promoter recovery element comprises a gaseous $CO_2$ hydrate promoter absorber and an absorbent/absorbed gaseous $CO_2$ hydrate promoter separator.

13. The system according to claim 12, wherein said absorbent/absorbed gaseous $CO_2$ hydrate promoter separator comprises a steam separator.

14. The system according to claim 11, wherein said gaseous $CO_2$ hydrate promoter recovery element comprises a lean absorbent recycling element for cycling lean absorbent from said separator to said absorber.

15. The system according to claim 11, wherein said hydrate formation reactor comprises a finned tubular reactor.

16. A system for selectively removing $CO_2$ from a multicomponent gaseous stream to produce a $CO_2$ depleted gaseous stream comprising a finned tubular hydrate formation reactor.

17. The system according to claim 16, wherein said finned tubular reactor comprises a tubular reactor with a helical fin structure.

18. The system according to claim 16, wherein said finned tubular reactor comprises a tubular reactor with a longitudinal fin structure.

19. The system according to claim 16, wherein said system further comprises a gaseous $CO_2$ hydrate promoter recovery element for recovering gaseous $CO_2$ hydrate promoter from a product stream from said reactor.

20. The system according to claim 19, wherein said system further comprises a gaseous $CO_2$ hydrate promoter recycling element for recycling recovered gaseous $CO_2$ hydrate promoter to said hydrate formation reactor or an input stream thereof.

* * * * *